United States Patent [19]
Rinehart

[11] Patent Number: 5,645,780
[45] Date of Patent: Jul. 8, 1997

[54] METHOD OF PLACING AN EYEPIECE IN A TAXIDERMY MANNIKIN USING A PROTECTIVE AND RELEASE COATING

[75] Inventor: John R. Rinehart, Milton, Wis.

[73] Assignee: American Institute of Taxidermy, Inc., Janesville, Wis.

[21] Appl. No.: 618,627

[22] Filed: Mar. 19, 1996

[51] Int. Cl.$^6$ ............................. B29C 44/12; B29C 44/18
[52] U.S. Cl. ........................ 264/46.4; 264/46.6; 264/130; 264/134; 264/271.1; 264/275; 156/247
[58] Field of Search ................................. 264/278, 130, 264/134, 275, 271.1, 46.4, 46.6; 156/247

[56] References Cited

U.S. PATENT DOCUMENTS

| | | |
|---|---|---|
| 4,432,919 | 2/1984 | Rinehart . |
| 4,436,276 | 3/1984 | Donahue ................................. 264/278 |
| 4,511,522 | 4/1985 | Rinehart . |
| 4,515,340 | 5/1985 | Rinehart . |
| 4,596,683 | 6/1986 | Powell . |
| 4,629,650 | 12/1986 | Kataoka ................................. 156/247 |
| 4,642,209 | 2/1987 | Powell . |
| 4,735,752 | 4/1988 | Negethon, Jr. ......................... 264/222 |
| 4,752,229 | 6/1988 | Clingerman et al. .................... 264/222 |
| 4,753,412 | 6/1988 | Johnson . |
| 4,781,597 | 11/1988 | Cowley ................................. 264/222 |

*Primary Examiner*—Allan R. Kuhns
*Attorney, Agent, or Firm*—Foley & Lardner

[57] ABSTRACT

A protective and release coating is applied to the front portion of an artificial eyepiece before it is placed in a mold to form a taxidermy animal head mannikin. The protective and release coating is preferably a latex material that protects the front surface of the glass or plastic artificial eyepiece from scratching or other damage while being placed in a mannikin mold. The mannikin mold defines a cavity surface contoured for correct anatomical features of the animal head mannikin, including the features immediately surrounding the eye. Eye socket recesses in the cavity surface are shaped to snugly receive the front portions of the eyepieces. Indicia ridges or locator sockets may be located around or in the eye socket recesses, to facilitate the proper orientation of artificial eyepieces within the eye sockets. The latex protective and release coating is preferably applied by spraying onto the front portion of the artificial eyepiece and allowed to set to form a cross-linked polymer coating before the eyepiece is positioned in the mold cavity eye socket. An adhesive may also be used to help hold the coated eyepiece in the mold eye socket. A liquid foamable and hardenable material is injected into the mold cavity, where it is allowed to expand and harden, thereby forming the taxidermy mannikin and fixing the eyepiece into the mannikin in proper position therein. The mold is then separated from the formed mannikin, and the protective and release coating is removed by peeling the coating from the front portion of the artificial eyepiece.

14 Claims, 3 Drawing Sheets

METHOD OF PLACING AN EYEPIECE IN A TAXIDERMY MANNIKIN USING A PROTECTIVE AND RELEASE COATING

FIELD OF THE INVENTION

This invention pertains generally to the field of taxidermy mannikins, and particularly to mannikin molds having artificial eyepieces attached thereto and methods for attaching the eyepieces to the mannikin molds.

BACKGROUND OF THE INVENTION

Taxidermists mount animal head skins over molded animal head mannikins, such as deer head mannikins, and secure the result to a wall plaque or the like for use as a trophy. The mannikins are typically molded of light-weight polyurethane foam material. Molds and molding methods for producing taxidermy animal head mannikins are disclosed in U.S. Pat. Nos. 4,432,919, 4,511,522, and 4,515,340 issued to John R. Rinehart, the disclosures of which are hereby incorporated by reference. These patents disclose molds and molding methods for producing taxidermy animal head mannikins complete with eyes and eye-surrounding anatomy as part of the mannikin when it comes out of the mold. Thus, the taxidermist need not spend time and skill positioning or mounting the eyes, or filling in and contouring around the eyes to provide correct anatomical eye-surrounding features. The mannikin molds disclosed in these patents also include reference indicia in the cavity surfaces of the mold near the edge of the eye socket recesses. These reference indicia may be used to align an artificial eyepiece to be inserted in the eye socket recess in the correct position. These patents also disclose the use of a removable (cleanable) adhesive to hold the eyepiece in the correct position on the mold during the molding operation. The adhesive is removable (cleanable) from the front portion of the eyepiece after the molding operation is complete and the completed mannikin is removed from the mold.

Another method of placing an eyepiece in an animal head mannikin is disclosed in U.S. Pat. No. 4,596,683 to Powell, which discloses an eyepiece having a circular flange with two notches which mate with two diametrically opposed lugs on edges of the mold eye socket recess to lock the eyepiece into position. U.S. Pat. No. 4,642,209, also to Powell, discloses a method of holding an eyepiece in position on the mold during the molding process by applying an adhesive onto the mold eye socket which selectively releases from the eye, but remains adhered to the mold, when the parts of the mold are separated to remove the mannikin. U.S. Pat. No. 4,753,412 to Johnson discloses a method for locating an eyepiece in correct position in the mannikin mold using a locator piece attached to the front of the eyepiece with a removable adhesive. The locator piece is positioned in a corresponding locator socket in the mold eye socket. The disclosure of this patent is also hereby incorporated by reference.

It is known in the art of taxidermy mannikin fabrication to apply a wax coating to the front surface of the artificial eyepiece before it is positioned in the eye socket cavity of the mannikin mold. The wax coating helps to release the eyepiece surface from the mold when the mannikin is removed from the mold in which it is formed. The adhesive applied to hold the eyepiece in place during the molding operation will not adhere as strongly to a wax coated eyepiece as to an uncoated eyepiece. The wax coating also helps protect the front surface of the eyepiece form being scratched or otherwise damaged from contact with the mannikin mold surface. Application and removal of a wax coating to and from the eyepiece is, however, a messy and time consuming process.

SUMMARY OF THE INVENTION

The present invention provides a new and improved method of placing an artificial eyepiece in an animal head taxidermy mannikin. The mannikin is made using a mold which includes a pair of mold cavity half parts. Each half part of the mold has a cavity surface contoured for correct anatomical formation of the features of half of the mannikin, including an eye socket recess in the cavity surface shaped for snugly receiving the front portion of an artificial eyepiece while leaving the rear portion of the eyepiece projecting into the mold cavity. The mold may preferably include a locator socket located in the eye socket recess. The locator socket is designed to receive a mating locator piece which is affixed to the front portion of the eyepiece, preferably using a removable (cleanable) adhesive, and is positioned thereon so that the placement of the locator piece in the locator socket locates the eyepiece in proper anatomical position. Alternatively, the mold may include reference indicia near the edge of the eye socket recess, which may be used to aid in aligning the eyepiece in the proper position in the socket.

Before the eyepiece is placed in position on the mannikin mold, a protective and release coating is applied to a front portion of the eyepiece. If a locator pieces is used, the locator piece is affixed to the front portion of the eyepiece before the protective and release coating is applied. The protective and release coating is preferably a latex material which is sprayed, brushed, or otherwise applied to the front portion of the glass or plastic artificial eyepiece. The applied protective and release coating is allowed to set up, forming a cross-linked polymer coating which may be later peeled off of the front of the eyepiece. After the coating is allowed to set up, of the eyepiece may be properly oriented and inserted into the eye socket recess of the mold, such as by seating the locator piece within the locator socket. An adhesive may also be applied between the eyepiece and the eye socket to help hold the eyepiece in position. The protective and release coating protects the front surface of the eyepiece from being scratched or otherwise damaged while it is being positioned in the mold. Since less care need thus be taken in placing the eyepiece in the mold, the rate of production of animal head taxidermy mannikins may be increased.

With the eyepiece placed in the mold and oriented correctly, the mold is closed. A polyurethane foam is then injected into the mold to form the animal head mannikin. After the foam hardens, the animal head mannikin is removed from the mold. The protective and release coating also helps to release the eyepiece from the mold. This is due to the fact that an adhesive applied between the eyepiece and the mold surface will tend not to adhere as strongly to the protective and release coating as it would to an uncoated glass or plastic eyepiece. The protective and release coating may then be removed by peeling the coating from the surface of the eyepiece to reveal an unscratched and undamaged eyepiece surface.

The use of a protective and release coating during the process of placing an eyepiece in an animal head taxidermy mannikin in accordance with the present invention may be accompanied by the use of various removable (cleanable) adhesives or other previously known methods for holding or locating eyepieces in a taxidermy mannikin. Instead of using a locator piece and locator socket to properly position the eyepiece in the mold, reference indicia on the cavity surface of the mold near the edge of the eye socket recess may be used to align the eyepiece to be inserted in the eye socket recess. Since a locator piece is not used, the protective and release coating is applied directly over the entire front surface of the eyepiece. An adhesive is then applied to the eye socket, and the coated eyepiece is placed therein in the proper orientation using the reference indicia. Formation of the animal head mannikin by injection molding, removal of the mannikin from the mold, and removal of the protective and release coating by peeling the coating from the surface of the eyepiece then proceeds as described above.

Use of a protective and release coating during the process of placing an eyepiece in an animal head taxidermy mannikin results in the advantages described earlier. The protective and release coating protects the front surface of the eyepiece from being scratched or damaged during placement in the mannikin mold. Since eyepieces can, therefore, be more rapidly put into position within the mold, the speed of producing animal head taxidermy mannikins is increased. Also, the protective and release coating helps to release the eyepiece from the mold when the mold is opened to remove the formed mannikin. The use of a latex material to form the protective and release coating allows the coating to be easily applied to the front surface of the eyepiece and to be easily removed by peeling the coating from the eyepiece surface after the taxidermy mannikin is formed.

Further objects, features, and advantages of the invention will be apparent from the following detailed description taken in conjunction with the accompanying drawings.

DETAILED DESCRIPTION OF THE INVENTION

Figure 1:
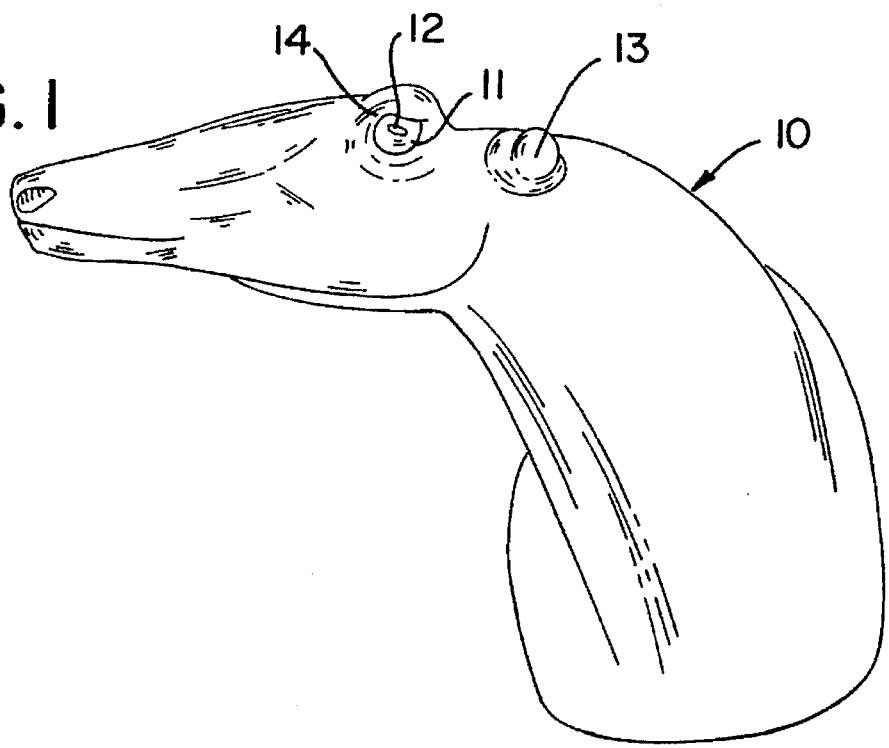
FIG. 1 is a view of a taxidermy mannikin made in accordance with the method of the present invention.

Referring to the drawings, FIG. 1 shows a deer head mannikin 10 made in accordance with the method of the present invention. It is apparent that taxidermy mannikins of animals other than deer may also be made in accordance with the present invention. The mannikin 10 is preferably made of a light-weight polyurethane foam material. The mannikin has, insert-molded in the foam material, an artificial eyepiece 11. The eyepiece 11 may have an elongated pupil 12. The mannikin 10 has the correct anatomical features of a deer head, including an ear stump 13 and eye-surrounding features 14.

Figure 2:
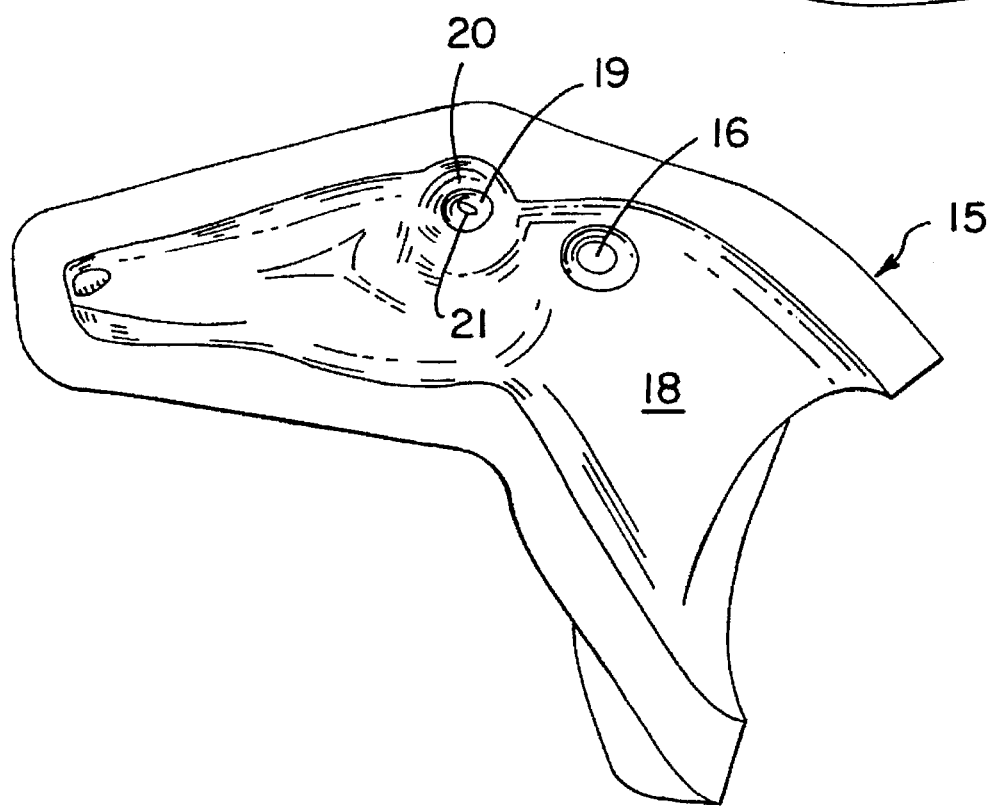
FIG. 2 is a view of the inside of one of the half parts of a taxidermy mannikin mold used in accordance with the method of the present invention.

A right side half part 15 of a mold for forming the mannikin 10, shown in FIG. 1, is shown in FIG. 2. The left side half part of the mold will be similar. The mold 15 may preferably be made of fiberglass, which is coated with a gel to facilitate removal of the mannikin which is formed therein. The mold 15 includes a cavity surface 18 which is contoured to correctly form all features of the mannikin 10, including the features immediately surrounding the eye, and, accordingly, the cavity surface 18 is contoured as indicated at 20 in FIG. 2 to provide the correct features indicated at 14 in FIG. 1. The cavity surface 18 also includes an ear stump recess 16 for forming the ear stump 13, and an eye socket recess 19. A small elongated locator socket 21 may be located in the eye socket recess 19. The locator socket 21 is used, as described in more detail below, to properly position the eyepiece 11 within the socket 19.

Figure 3:
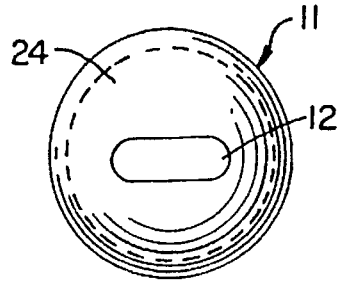
FIG. 3 is a front elevation view of an artificial eyepiece with an elongated pupil used in carrying out the invention.
Figure 4:
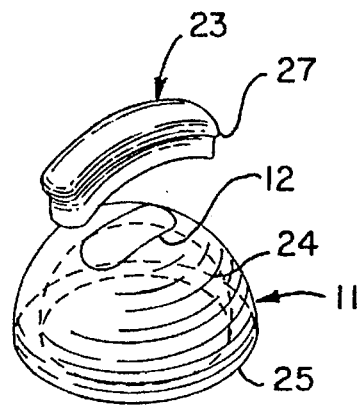
FIG. 4 is a perspective view of the eyepiece of FIG. 3 and an elongated locator piece projected away from the eyepiece.
Figure 5:
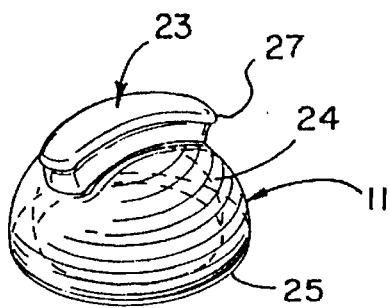
FIG. 5 is a perspective view of the artificial eyepiece of FIG. 3 with the elongated locator piece affixed thereto.

An artificial eyepiece 11, having an elongated pupil 12, is shown in FIG. 3. It is apparent that artificial eyepieces 11 having round or other shaped pupils 12 may also be used in accordance with the present invention. The eyepiece 11 is preferably made of glass or plastic, and is a semi-spherical shell having a front portion surface 24 and having its concavity on the rear side 25 thereof. In FIG. 4, an elongated locator piece 23 is shown, along with the eyepiece 11, with the locator piece 23 projected above the eyepiece 11 in proper orientation before its attachment to the eyepiece 11. The locator piece 23 is aligned with the eyepiece 11 over the elongated pupil 12 so that a long axis of the locator piece 23 is aligned with the long axis of the pupil 12. Differently shaped locator pieces 23 may be used for correspondingly differently shaped eyepiece pupils 12. The locator piece 23 is preferably affixed to the front portion 24 of the eyepiece 11 with a removable (cleanable) adhesive, which will hold the locator piece 23 in position during the molding operation, and will be removable (cleanable) from the front portion 24 of the eyepiece 11 after the molding operation.

After the locator piece 23 is properly affixed to the front portion 24 of the eyepiece 11, a protective and release coating 26 is applied to the front surface 24 of the eyepiece 11. Note that the protective and release coating 26 may thus also be applied over the locator piece 23. (However, the protective and release coating 26 is preferably not applied before the locator piece 23, as the protective and release coating would not allow the locator piece 23 to properly adhere to the eyepiece 11.) The protective and release coating is preferably a latex material, such as the translucent white "fluid mask" masking agent (product code FM-01) which is available from House of Kolor, Inc. of Minneapolis, Minn. Other similar latex materials which provide a peelable protective coating on glass or plastic may also be used. An example of another material suitable for use as a protective and release coating is the "perma mold" material available from Chem-Trend, Inc. of Howell, Mich. "Perma mold" is a wax-like material that may be peeled off of the eyepiece surface.

The protective and release coating may be applied in various ways, such as by brushing the material in liquid form on to the surface of the eyepiece 11, or by dipping the eyepiece into the material. However, the protective and release coating is preferably applied by spraying the latex material on to the surface of the eyepiece using a spray gun, such as the primer gun having a 2 mm needle opening with HVLP gravity feed which is made by Optima. Spraying is a fast and efficient method of applying the latex coating which allows multiple eyepieces to be coated at the same time. After the protective and release coating is applied to the eyepiece 11 it is allowed to set up for 30–45 minutes before the eyepiece 11 is placed into the mold 15. Preferably, the eyepiece may be left to set overnight after the protective and release coating is applied. During the set up process, an applied latex forms a cross-linked polymer coating which may later be peeled back off of the front surface of the eyepiece 11.

Figure 6:
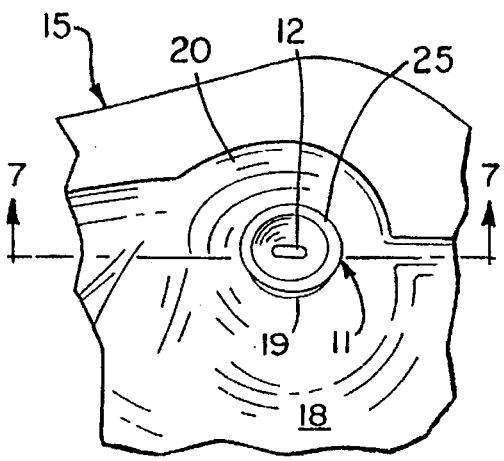
FIG. 6 is an enlarged view of a portion of the mold shown in FIG. 2, showing the artificial eyepiece inserted therein in proper position.
Figure 7:
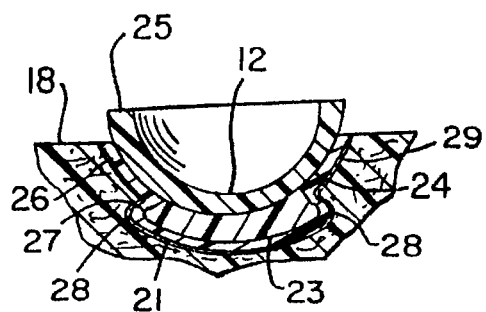
FIG. 7 is a cross-section view taken along line 7—7 of FIG. 6.

After the protective and release coating 26 is properly applied and set, the eyepiece 11 may be inserted into the eye socket recess 19 as shown in FIGS. 6 and 7. The eyepiece 11 is inserted into the eye socket recess 19 in such a manner that the elongated locator piece 23 seats within the corresponding elongated locator socket 21. To do this, the eyepiece 11 must be rotationally oriented so that the long axis of the locator piece 23 is aligned with the long axis of the locator socket 21. When the eyepiece 11 is inserted properly, the elongated pupil 12 will be properly aligned anatomically, and the eyepiece 11 will be correctly located in relationship with the other features of the mold 15. In placing the eyepiece 11 into the eye socket 19, it is apparent that the front surface 24 of the eyepiece 11 is likely to come into contact with the relatively rough inner surface of the eye socket cavity 19. This is likely to cause the surface 20 of the eyepiece to become scratched or damaged unless great care is taken. However, by using the protective and release coating 26 in accordance with the present invention, such damage to the surface 24 of the eyepiece can be avoided. Also, since special care need not be taken during placement of the eyepiece 11 to avoid damage to the eyepiece surface 24, eyepieces 11 may be more rapidly inserted into the mold 15. Thus, the rate of production of animal head taxidermy mannikins 10 may be increased.

As shown, it is preferable that the locator piece 23 have a lip 27 which corresponds to a widened portion 28 of the locator socket. The lip 27 and widened portion 28 together act to retain the locator piece 23 in the locator socket 21 once the eyepiece 11 has been inserted into the socket recess 19. An adhesive 29 may also preferably be placed around the locator piece 23 and on the front portion 24 of the eyepiece 11 between the coated eyepiece 11 and mold eye socket 19 so that, when the eyepiece 11 is inserted in the socket 19, the adhesive will hold the eyepiece 11 in position during the molding operation, leaving the rear portion 25 of the eyepiece 11 projecting into the mold cavity 18. A preferable adhesive material that may be used is the "Sculpall" epoxy compound available from Engineered Materials Systems, Inc. of Worthington, Ohio. Only part B of this two part A and B epoxy compound is used. This adhesive material has the consistency of clay, is spreadable, non-water soluble, and non-hardening. Since only one part of the epoxy is used, the adhesive never fully sets up.

To form the animal head mannikin 10, two half parts 15 of the mold are joined together. A polyurethane foam is then injected into the mold cavity 18. The foam is injected at approximately 180° F., and is allowed to cool and harden to form the mannikin 10. After the polyurethane foam material has foamed and hardened, the two half parts 15 of the mold are separated to reveal the formed mannikin 10. The lip 27 and widened portion 28 of the locator piece 23 and locator socket 21 may cause the locator piece 23 to remain in the locator socket 21 when the two half parts 15 of the mold are separated. Thus, separating the two half parts 15 of the mold from the formed mannikin 10 will serve also to remove the locator piece 23 from the front portion 24 of the eyepiece 11 (since the locator piece 23 was held thereon by a removable (cleanable) adhesive). The protective and release coating 26 also helps to release the eyepiece 11 from the mold 15 when the two half parts of the mold are separated. Any adhesive applied to help keep the eyepiece 11 in its proper position will be less likely to stick to an eyepiece 11 with a latex protective and release coating, than to a similar eyepiece 11 which is uncoated.

After the mannikin 10 is removed from the mold 15, with the eyepiece 11 embedded in the mannikin 10, the protective and release coating 26 may be removed from the front surface 24 of the eyepiece 11. The protective and release coating 26 is removed by peeling the coating, which forms a latex skin, off of the front surface 24 of the eyepiece 11. After removing the protective and release coating, the front surface 24 of the eyepiece 11, unscratched and undamaged, will be revealed.

Figure 8:
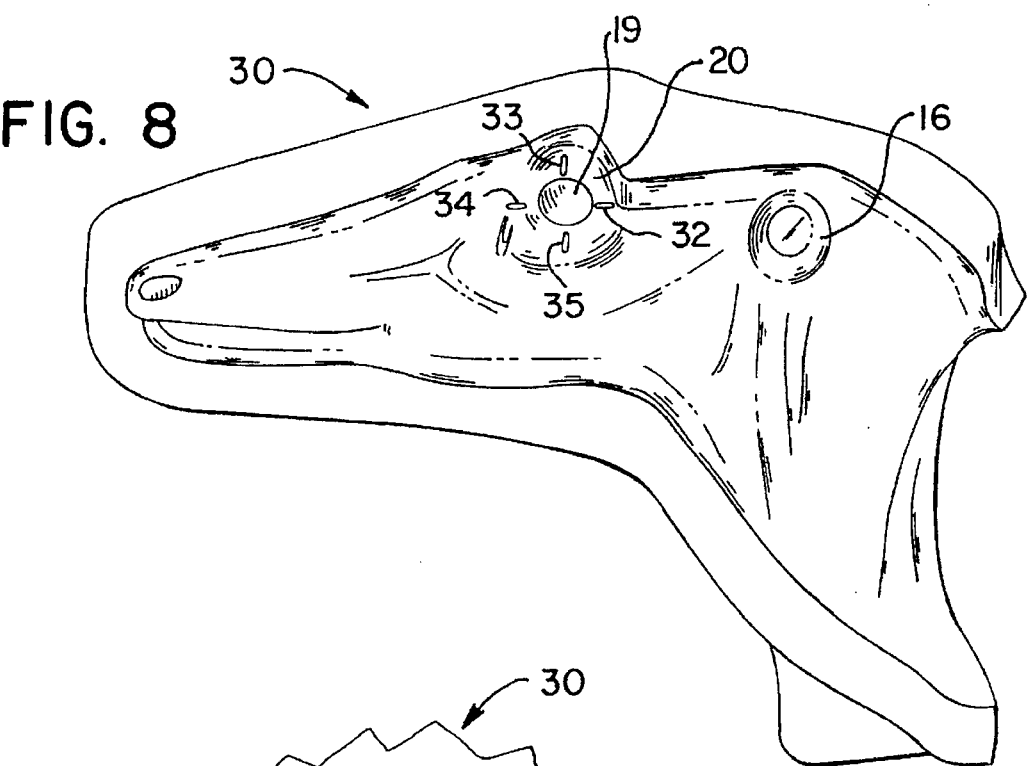
FIG. 8 is a view of the inside of one of the half parts of an alternative taxidermy mannikin mold used in carrying out the method of the present invention.

The advantages achieved by using a protective and release coating for the placement of an artificial eyepiece in an animal head taxidermy mannikin mold may be achieved with mannikin molds of various designs and having various methods of properly orienting an eyepiece in the mold. For example, a right side half part 30 of an alternative mold for forming the taxidermy mannikin 10, is shown in FIG. 8. The left side half part of the mold will be similar. The mold 30 of FIG. 8 is similar to the mold 15 of FIG. 2, and, therefore, like features of the two molds are identified with the same reference numerals. Instead of having a locator socket 21, however, ridges 32, 33, 34, and 35 are formed in the eye socket surrounding area 20 of the mold 30. The ridges 32, 33, 34, and 35 serve as indicia markings to facilitate proper positioning of the eyepiece 11 in the eye socket recess 19.

Figure 9:
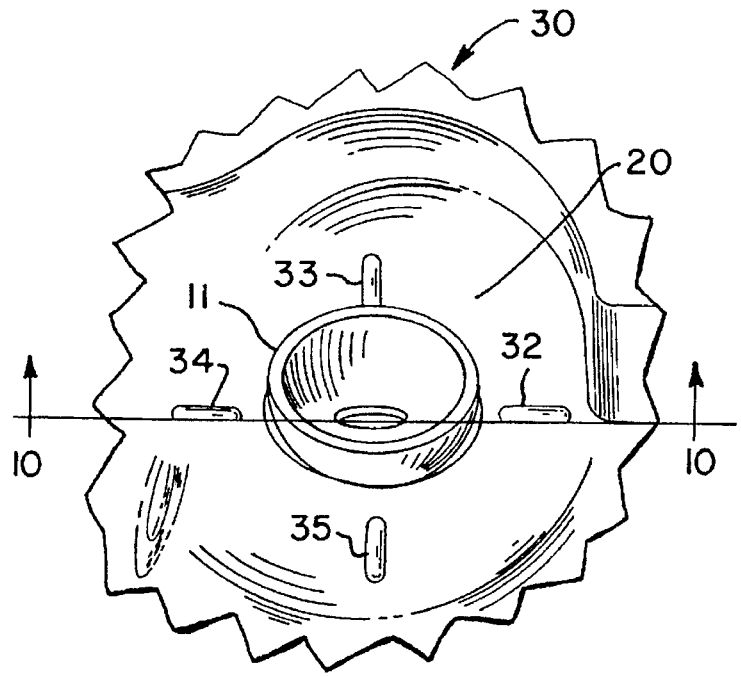
FIG. 9 is an enlarged view of a portion of the mold shown in FIG. 8, showing an artificial eyepiece inserted therein in proper position.
Figure 10:
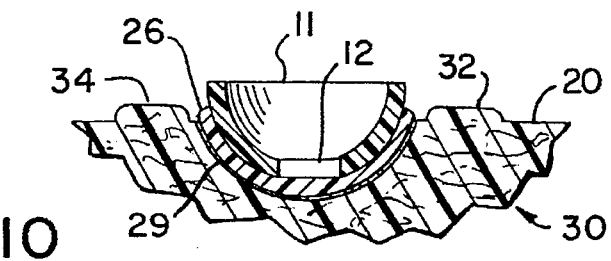
FIG. 10 is a cross-section view taken along line 10—10 of FIG. 9.

The mannikin mold 30 may be used in accordance with the method of the present invention to form a taxidermy mannikin in a manner similar to that described above. As an initial step to placing the artificial eyepiece 11 into the mold eye socket 19, the front surface of the eyepiece 11 is coated with a protective and release coating 26. As described above, the protective and release coating 26 is preferably made of a latex material which is preferably sprayed onto the front surface of the eyepiece 11 and allowed to set to form a cross-linked polymer coating. An adhesive 29 may then be applied between the mold eye socket 19 and the front surface of the coated eyepiece 11. The coated eyepiece 11 is then positioned in the eye socket 19 as illustrated in FIGS. 9 and 10. By aligning the elongated pupil 12 of the eyepiece 11 with the reference indicia ridges 32 and 34, the eyepiece 11 may be easily placed in the mold eye socket 19 in the proper anatomical orientation. The protective and release coating 26 allows the eyepiece 11 to be placed in the eye socket 19 and to be rotated, or otherwise repositioned, into the proper anatomical position without risk of scratching or otherwise damaging the front surface of the eyepiece 11. Thereby, since extra care need not be taken in positioning the eyepiece 11 to prevent damage to the eyepiece, the rate of production of taxidermy mannikins, by employing a protective and release coating in accordance with the method of the present invention, may be increased.

Completion of an animal head taxidermy mannikin may then proceed as described above. Two half parts of the mold 30 are joined to form a mold cavity. A polyurethane foam is then injected into the mold cavity, where it is allowed to cool and harden to form the taxidermy mannikin. The mold is then opened to reveal the formed mannikin. The protective and release coating 26 allows the eyepiece 11 to be cleanly released from the mold eye socket 19 when the mold is opened. The protective and release coating 26 may then be removed by peeling the coating 26 from the front surface of the eyepiece 11.

It is understood that the invention is not confined to the particular embodiments herein illustrated and described, but embraces such modified forms thereof as come within the scope of the following claims.

What is claimed is:

1. A method of placing an artificial eyepiece in a taxidermy animal head mannikin, comprising the steps of:
   (a) providing a mold which defines a cavity surface contoured for correct anatomical features of the mannikin including features immediately surrounding an eye, and an eye socket recess in the cavity surface for snugly receiving a front portion of the eyepiece;
   (b) applying a protective and release coating to a front portion of the artificial eyepiece to prevent damage to the eyepiece when it is inserted into the mold, and allowing the applied coating to set up;
   (c) inserting into the eye socket recess of the mold the coated front portion of the artificial eyepiece such that the eyepiece is held in the eye socket recess in a desired position and such that a rear portion of the artificial eyepiece projects into the mold cavity;
   (d) introducing a liquid foamable hardenable material into the mold cavity to foam, expand and harden, thereby forming the mannikin and locking the eyepiece into the mannikin in a proper position therein;
   (e) separating the mold from the formed mannikin; and
   (f) removing the protective and release coating by peeling the coating from the front portion of the artificial eyepiece.

2. The method of claim 1 wherein the mold comprises two half parts which together define the cavity surface, and additionally comprising the step of closing the half parts of the mold together to form a full mold cavity therebetween.

3. The method of claim 1 wherein the mold cavity surface includes indicia ridges spaced about the eye socket recess, wherein the artificial eyepiece has a pupil, and additionally comprising the step of orienting the eyepiece in a desired position in the eye socket by aligning the pupil with the indicia ridges.

4. The method of claim 1 wherein the mold cavity surface includes a locator socket in the eye socket, wherein the artificial eyepiece has a locator piece attached to the front portion of the eyepiece, wherein the protective and release coating is applied over the front portion of the artificial eyepiece and the locator piece, and additionally comprising the step of orienting the eyepiece in a desired position in the eye socket by placing the locator piece attached to the front portion of the artificial eyepiece into the locator socket.

5. The method of claim 1 comprising additionally the step of applying an adhesive between the eye socket of the mold cavity surface and the coated front portion of the artificial eyepiece before inserting the coated front portion of the artificial eyepiece into the eye socket.

6. The method of claim 1 wherein the protective and release coating is a latex material.

7. The method of claim 6 wherein the step of applying the latex protective and release coating to the front portion of the artificial eyepiece includes the steps of spraying a liquid latex onto the front portion of the artificial eyepiece using a spray gun, and allowing the applied latex to set to form a cross-linked polymer coating.

8. The method of claim 7 wherein the step of allowing the applied latex coating to set lasts at least one-half hour.

9. A method of placing an artificial eyepiece in a taxidermy animal head mannikin, comprising the steps of:
   (a) providing a mold which defines a cavity surface contoured for correct anatomical features of the mannikin including features immediately surrounding an eye, and an eye socket recess in the cavity surface for snugly receiving a front portion of the eyepiece and including a locator socket within the eye socket recess;
   (b) attaching a locator piece to a front portion of the artificial eyepiece using a cleanable and removable adhesive;
   (c) applying a protective and release coating over the front portion of the artificial eyepiece and over the locator piece attached to the artificial eyepiece to prevent damage to the eyepiece when it is inserted into the mold, and allowing the applied coating to set up;
   (d) inserting into the eye socket recess of the mold the coated front portion of the artificial eyepiece such that the locator piece is placed within the locator socket to hold the eyepiece in the eye socket recess in a desired position and such that a rear portion of the artificial eyepiece projects into the mold cavity;
   (e) introducing a liquid foamable hardenable material into the mold cavity to foam, expand and harden, thereby forming the mannikin and locking the eyepiece into the mannikin in a proper position therein;
   (f) separating the mold from the formed mannikin; and
   (g) removing the protective and release coating by peeling the coating from the front portion of the artificial eyepiece.

10. The method of claim 9 wherein the mold comprises two half parts which together define the cavity surface, and including the additional step of closing the half parts of the mold together to form a full mold cavity therebetween.

11. The method of claim 9 comprising additionally the step of applying an adhesive between the eye socket of the mold and the coated front portion of the artificial eyepiece before inserting the coated front portion of the artificial eyepiece into the eye socket.

12. The method of claim 9 wherein the protective and release coating is a latex material.

13. The method of claim 12 wherein the step of applying the latex protective and release coating over the front portion of the artificial eyepiece and the locator piece attached to the front portion of the eyepiece includes the steps of spraying a liquid latex onto the front portion of the artificial eyepiece using a spray gun, and allowing the applied latex to set to form a cross-linked polymer coating.

14. The method of claim 12 wherein the step of allowing the applied latex coating to set lasts at least one-half hour.

* * * * *